United States Patent [19]

Neimark

[11] 3,740,314
[45] June 19, 1973

[54] FUEL PIN FOR A LIQUID-METAL-COOLED FAST-BREEDER NUCLEAR REACTOR

[75] Inventor: Lawrence A. Neimark, Elmhurst, Ill.

[73] Assignee: The United States of America as represented by the United States Atomic Energy Commission, Washington, D.C.

[22] Filed: Jan. 28, 1972

[21] Appl. No.: 221,745

[52] U.S. Cl. .................. 176/68, 176/17, 176/74, 176/77, 176/40
[51] Int. Cl. .................................................. G21c 3/18
[58] Field of Search .................. 176/40, 64, 73, 74, 176/68, 77, 83, 17, 18

[56] References Cited
UNITED STATES PATENTS

| | | | |
|---|---|---|---|
| 3,362,882 | 1/1968 | Sofer et al. | 176/18 |
| 3,619,366 | 11/1971 | Chubb et al. | 176/79 X |
| 3,145,149 | 8/1964 | Imhoff | 176/73 X |

*Primary Examiner*—Carl D. Quarforth
*Assistant Examiner*—E. E. Lehmann
*Attorney*—Roland A. Anderson

[57] ABSTRACT

An inherently safe fuel pin for a liquid-metal-cooled fast-breeder nuclear reactor is designed so that axial movement of molten fuel is enhanced and return of the molten fuel to the fuel zone is prevented if a sudden reactivity insertion causes melting of the fuel. The fuel pin includes an annular upper blanket separated from a solid fuel zone by a conical nozzle the upper nose of which is welded into a grid plate which extends across the fuel pin and supports the annular upper blanket. Molten fuel is ejected into the central opening of the annular blanket through the conical nozzle which also prevents molten fuel from reentering the fuel zone.

4 Claims, 4 Drawing Figures

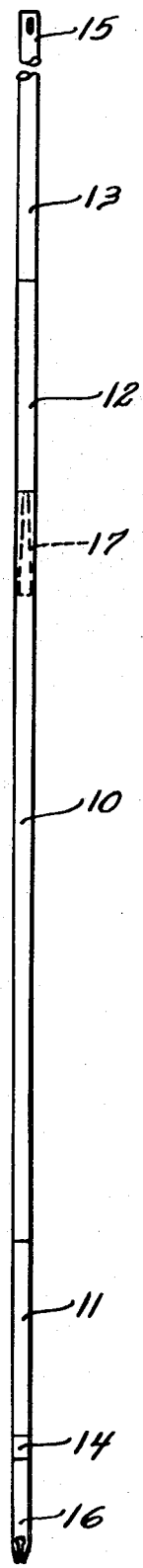
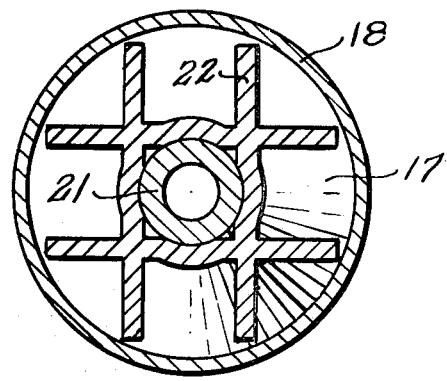
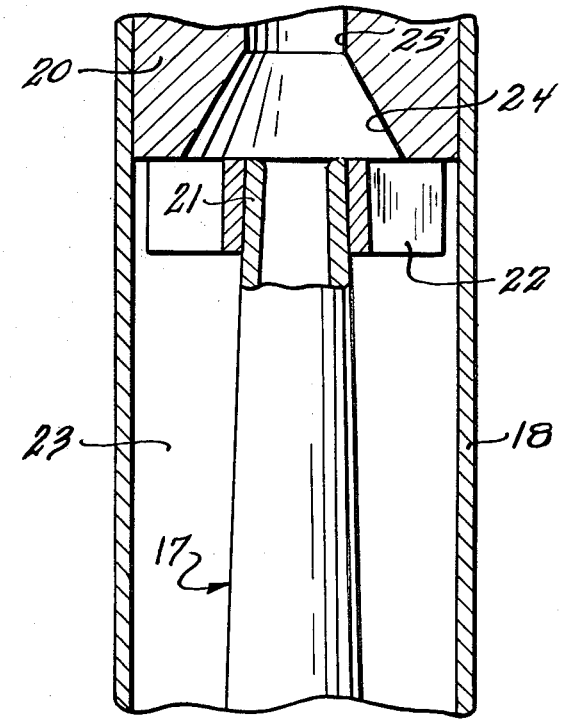
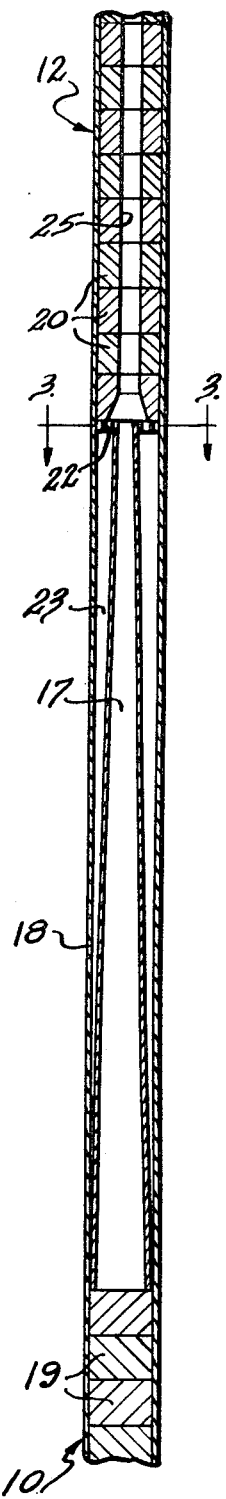

FUEL PIN FOR A LIQUID-METAL-COOLED FAST-BREEDER NUCLEAR REACTOR

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to an inherently safe fuel pin for a liquid-metal-cooled fast-breeder reactor. In more detail the invention relates to a fuel pin in which the consequences of overpower transients or fuel pin failures are precluded or mitigated. The invention also relates to a fuel pin in which irreversible movement of fuel results from fuel melting. In still more detail the invention relates to a fuel pin incorporating means for enchancing axial movement of molten fuel and for preventing molten fuel from reentering the core region if a reactivity addition or increase in power should cause fuel melting.

Before liquid-metal-cooled fast-breeder reactors can be commercially practicable, it must not only be certain that no conceivable accident could cause a release of radioactivity to the environment but also that relatively minor reactivity additions or increases in power will not cause the reactor to be out of service for an extended period of time. Thus the purpose of an inherently safe fuel element design for a fast-breeder reactor is to preclude or mitigate the consequences of overpower transients or fuel element failures. Serious accidents due to increased reactivity can be mitigated by moving fuel axially away from the core midplane. It has been shown that the energy transient required to cause failure of an irradiated oxide fuel pin can be significantly increased if the fuel pin will accommodate a volume increase of molten fuel and will provide internal pressure relief. This can be accomplished by providing an annular blanket above the fuel. See Report No. GEAP-13543 by T. Hikido and J. H. Field. This report is available from the Clearing House for Federal Scientific and Technical Information, National Bureau of Standards, U. S. Department of Commerce, Springfield, Vir.

Movement of fuel axially within the fuel pin not only relieves the pressures which might cause the fuel pin to fail due to radial expansion of fuel but also reduces reactivity since fuel moves from a high worth position in the reactor core to a position of lower worth. Melting of the fuel followed by axial movement thus inherently causes a reduction in reactivity. However, molten fuel after having moved axially up into the upper blanket could then drop by gravity back into a high worth position in the reactor, causing an increase in reactivity. Such an increase, of course, could not be tolerated.

SUMMARY OF THE INVENTION

Accordingly, means for enhancing axial movement of molten fuel and for preventing the molten fuel from reentering the fuel zone of the fuel pin is provided in a fuel pin containing an annular upper blanket. This consists of a conical nozzle having its nose up, the nozzle causing the molten fuel to be ejected up into the blanket if an accident occurs and catching the molten fuel should it fall back in the fuel pin. A support grid for the annular blanket into which the nose of the conical nozzle is welded is provided at the top of the conical nozzle.

SPECIFIC EMBODIMENT OF THE INVENTION

The invention will next be described with reference to the accompanying drawing wherein:

FIG. 1 is a side elevational view of a fuel pin for a fast-breeder nuclear reactor, FIG. 2 is a vertical cross section of a portion thereof wherein is located a device for enhancing axial movement of molten fuel and for ensuring that the movement is irreversible, FIG. 3 is a horizontal cross section taken on the line 3—3 of FIG. 2, and FIG. 4 is a partial cross section taken on the line 4—4 of FIG. 3.

As shown in FIG. 1, a fuel pin for a fast-breeder reactor includes a fuel zone 10, a lower blanket 11, an upper blanket 12, a plenum 13, and an insulator zone 14, in addition to upper end cap 15 and lower end plug 16. In accordance with the present invention, a concical nozzle 17 is included between the upper blanket 12 and the fuel zone 10 and this feature will next be described in connection with FIGS. 2, 3 and 4 of the drawing.

In more detail, the fuel comprises a cladding tube 18 enclosing a plurality of solid cermaic fuel pellets 19 constituting fuel zone 10 and a plurality of annular ceramic blanket pellets 20 constituting upper blanket 12 in addition to lower blanket 11. Conical nozzle 17 is located between fuel zone 10 and upper blanket 12 and includes a nose 21 which is welded into the central opening of a grid plate 22. Grid plate 22 extends completely across cladding tube 18 and serves to support upper blanket 12. It will be observed that the grid plate 22 is slightly deformed to accommodate the conical nozzle. The lower, larger end of conical nozzle 17 abuts the cladding tube 18 to form a pocket 23 between the conical nozzle and the cladding tube. Chamber 24 is provided to enlarge axial opening 25 in the lowermost, upper blanket pellet 20 to open up pocket 23 to the axial opening in the upper blanket pellets.

According to one specific embodiment of the invention, the cladding tube is formed of stainless steel 0.25 inch in diameter, fuel zone 10 is 36 inches long, lower blanket 11 is 12 inches long, upper blanket 12 is 12 inches long and the axial opening 25 therein is 0.070 inch in diameter, plenum 13 is 3 feet long, insulator zone 14 is 0.5 inch long, and conical nozzle 17 is formed of stainless steel and is 3 inches long. The lower end of nozzle 17 fits snugly within cladding tube 18 and the diameter of the nose is 0.070 inch, the aperture therein being 0.040 inch in diameter. In addition, grid plate 22 is formed of two parallel stainless steel plates disposed at right angles to two other parallel stainless steel plates. The plates are 0.015 inch in thickness, have a height of 0.062 inch and the distance between plates is 0.062 inch. Finally, the fuel employed is mixed $UO_2$—$PuO_2$ and the blanket material is depleted $UO_2$.

Fuel pins of the type described above may be located at certain selected locations within a fast reactor core or all fuel pins may be constructed in this way. Detailed analysis for each reactor will be necessary to determine the optimum arrangement of these fuel pins. The fuel pin described herein has been designed specifically for a liquid-metal-cooled reactor; however, the invention described herein can be equally well applied to fuel pins for gas-cooled reactors.

As pointed out in the above-cited report, the sudden release of fission gases during a transient which results in fuel melting will give rise to substantial internal pressures and will provide a substantial driving force for fuel relocation and dispersion. Thus, should the fuel in a fuel pin constructed in accordance with the present invention melt, the fuel will be ejected upwardly through conical nozzle 17 into the central hole in annular blanket 12 and the distance travelled by the molten fuel is greater than it would be in the absence of the nozzle. In addition, the open structure of grid 18 and the small aperture in the nose of conical nozzle 17 result in the trapping in pocket 23 formed between the conical nozzle 17 and the cladding tube 18 of a substantial proportion of any molten fuel that subsequently flows downwardly out of the annular blanket. Trapping the fuel thus prevents the fuel from reentering the fuel zone and causing a reactivity increase. Thus provision of a conical nozzle in accordance with this invention ensures that fuel movement is fast, the fuel is moved a substantial distance and the movement is irreversible.

The embodiments of the invention in which an exclusive property or privilege is claimed are defined as follows:

1. In a fuel pin for a fast-breeder reactor incorporating cermaic fuel and an upper annular ceramic blanket supported by a grid plate, the improvement comprising a conical nozzle having its nose welded into said grid plate disposed between the ceramic fuel and the annular blanket for enhancing axial movement of molten fuel and for ensuring that this axial movement is irreversible if a re-activity insertion or increase in power causes fuel melting.

2. A fuel pin for a liquid-metal-cooled, fast-breeder reactor comprising a cladding tube, a plurality of ceramic fuel pellets constituting a fuel zone disposed in said cladding tube, a plurality of annular ceramic blanket pellets supported by a grid plate constituting an upper blanket disposed in said cladding tube above said fuel zone, and a conical nozzle having its nose welded into said grid plate located in the cladding tube between the upper blanket and the fuel zone for enhancing axial movement of molten fuel and for ensuring that this axial movement is irreversible if a reactivity insertion or increase in power should cause fuel melting.

3. A fuel pin according to claim 3 wherein the ceramic fuel is $UO_2$—$PuO_2$ and the blanket pellets are depleted $UO_2$.

4. A fuel pin according to claim 3 wherein the cladding tube is formed of stainless steel 0.25 inch in diameter, the conical nozzle is formed of stainless steel, the conical nozzle is 3 inches long, the outer diameter of the noze thereof is 0.070 inch and the aperture therein is 0.040 inch in diameter, the central opening in the annular blanket is 0.070 inch in diameter, and the inner edge of the lowermost annular blanket pellet is chamfered to enlarge the opening.

* * * * *